United States Patent
Ovshinsky et al.

(10) Patent No.: US 6,589,686 B2
(45) Date of Patent: Jul. 8, 2003

(54) METHOD OF FUEL CELL ACTIVATION

(75) Inventors: Stanford R. Ovshinsky, Bloomfield Hills, MI (US); Boyko Aladjov, Rochester Hills, MI (US); Srinivasan Venkatesan, Southfield, MI (US); Subhash K. Dhar, Bloomfield Hills, MI (US); Thomas Hopper, Clawson, MI (US); Kevin Fok, Troy, MI (US)

(73) Assignee: Ovonic Battery Company, Inc., Troy, MI (US)

(*) Notice: Subject to any disclaimer, the term of this patent is extended or adjusted under 35 U.S.C. 154(b) by 10 days.

(21) Appl. No.: 10/039,544

(22) Filed: Jan. 8, 2002

(65) Prior Publication Data

US 2002/0127466 A1 Sep. 12, 2002

Related U.S. Application Data

(63) Continuation-in-part of application No. 09/796,280, filed on Feb. 28, 2001.

(51) Int. Cl.[7] .............................................. H01M 10/44
(52) U.S. Cl. .............................. 429/52; 429/50; 429/13; 429/218.2; 29/623.1; 420/900
(58) Field of Search ............................... 429/218.2, 50, 429/52, 13; 420/900; 29/623.1

(56) References Cited

U.S. PATENT DOCUMENTS

| 5,560,752 | A | * | 10/1996 | Badding et al. | ............ 29/623.1 |
| 6,447,942 | B1 | * | 9/2002 | Ovshinsky et al. | ............ 429/27 |
| 6,461,766 | B1 | * | 10/2002 | Young et al. | ............ 429/218.2 |

* cited by examiner

*Primary Examiner*—Patrick Ryan
*Assistant Examiner*—Angela J. Martin
(74) *Attorney, Agent, or Firm*—Philip H. Schlazer; Marvin S. Siskind

(57) ABSTRACT

A method of activating a metal hydride electrode of an alkaline fuel cell. The method comprises the step of applying current cycles to the anode where each current cycle includes a forward current effective to at least partially charge the electrode and a reverse current effective to at least partially discharge the electrode.

11 Claims, 3 Drawing Sheets

FIG - 3
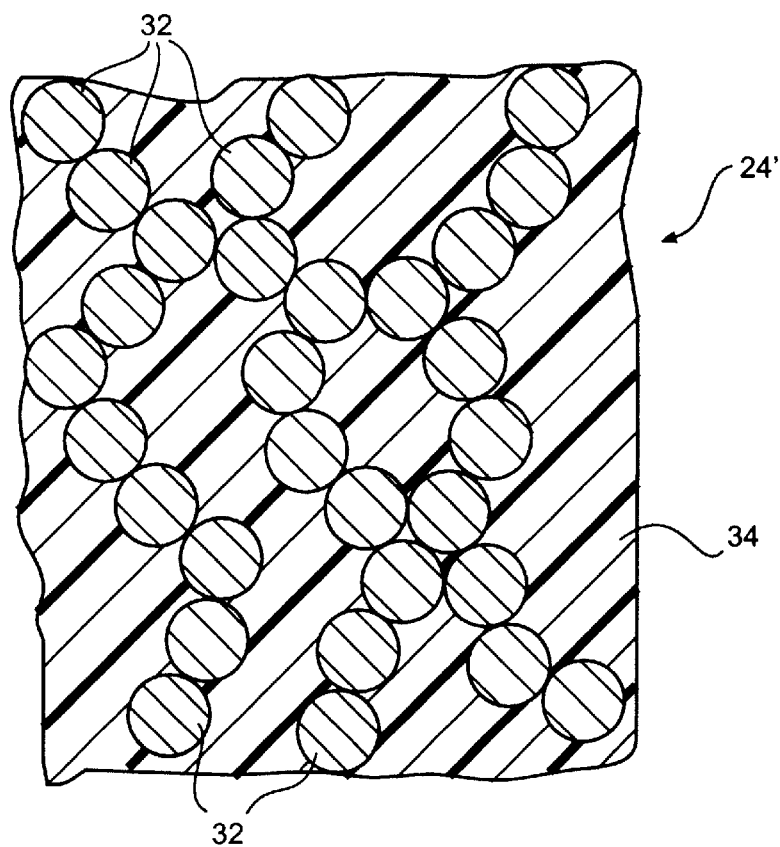
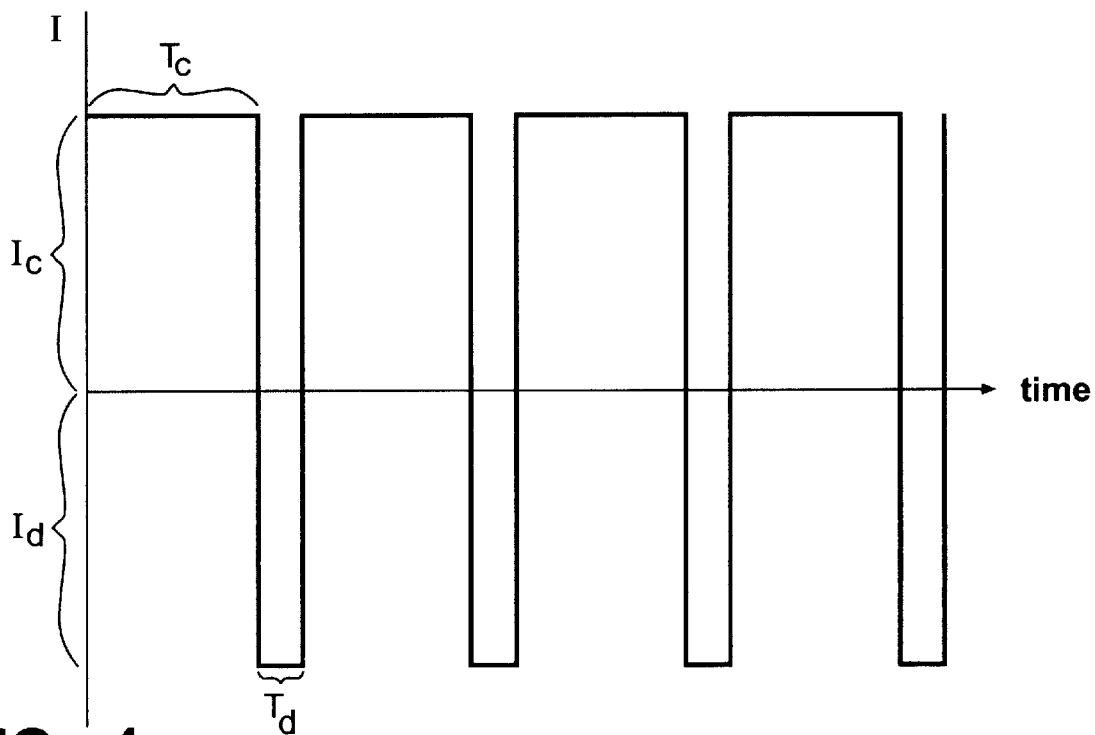
FIG - 4

METHOD OF FUEL CELL ACTIVATION

RELATED APPLICATION INFORMATION

This application is a continuation-in-part of U.S. patent application Ser. No. 09/796,280 filed on Feb. 28, 2001, the disclosure of which is hereby incorporated by reference herein.

FIELD OF THE INVENTION

The present invention is related to fuel cells. In particular, the present invention is related to fuel cells including metal hydride electrodes.

BACKGROUND OF THE INVENTION

A fuel cell is an electrochemical device in which the chemical energy of a conventional fuel is converted directly and efficiently into low voltage electrical energy. Fuel cells have many potential applications such as supplying power for transportation vehicles, replacing steam turbines and remote power supply applications.

Fuel cells, like conventional batteries, operate by utilizing electrochemical reactions. Unlike a battery, in which chemical energy is stored within the cell, fuel cells generally are supplied with reactants from outside the cell. Barring failure of the electrodes, as long as the fuel (preferably hydrogen), and the oxidant (preferably either oxygen or air that contains oxygen) are supplied and the reaction products are removed, the cell continues to operate.

Fuel cells also offer a number of important advantages over engine or generator systems. They include relatively highly efficient, environmentally clean operation especially when utilizing hydrogen as a fuel, high reliability, few moving parts, and quiet operation.

A schematic diagram of a fuel cell with the reactant/product gases and the ion conduction flow directions through the cell is shown in FIG. 1. Referring to FIG. 1, the major components of a typical fuel cell 10 is an anode 14 for hydrogen oxidation, a cathode 16 for oxygen reduction and an electrolyte layer 12. In the embodiment shown, the anode 14 and the cathode 16 are each in contact with and positioned on opposite sides of the electrolyte layer. During operation, a continuous flow of fuel, commonly hydrogen, is fed to the anode 14 while, simultaneously, a continuous flow of oxidant, commonly oxygen or air, is fed to the cathode 16. In the example shown, the hydrogen is fed to the anode 14 via a hydrogen compartment 13. Likewise, the oxygen or air is fed to the cathode 16 via an oxygen/air compartment 17. As noted in FIG. 1, one side of the anode 14 is in contact with the electrolyte layer 12 while the other side is in contact with the hydrogen compartment 13. Likewise, one side of the cathode 16 is in contact with the electrolyte layer 12 while the other side is in contact with the oxygen/air compartment 17.

The hydrogen fuel is oxidized at the anode with a release of electrons through the agency of a catalyst. These electrons are conducted from the anode 14 through wires external to the cell, through the load 18, to the cathode 16 where the oxidant is reduced and the electrons are consumed, again through the agency of a catalyst. The constant flow of electrons from the anode 14 to the cathode 16 constitutes an electrical current that can be made to do useful work. Typically, the reactants such as hydrogen and oxygen, are respectively fed through the porous anode 14 and cathode 16 and brought into surface contact with the electrolyte 12. The particular materials utilized for the anode 14 and cathode 16 are important since they must act as efficient catalysts for the reactions to take place. In certain types of fuel cells, such as alkaline fuel cells, the catalytic material used for the anode may comprise a hydrogen storage alloy material (also referred to as a metal hydride material). Hence, the anode may be a hydrogen storage alloy electrode (also referred to as a metal hydride electrode). Examples of such alkaline fuel cells that use hydrogen storage alloy materials are provided in U.S. patent application Ser. No. 09/524,116, the disclosure of which is incorporated by reference herein.

One of the crucial steps in the preparation of a hydrogen storage alloy electrode for use in a fuel cell is that of "activation". Activation increases the catalytic properties of the hydrogen storage alloy.

Activation, it is believed, increases the surface area and alters the chemical composition and/or structure of the hydrogen storage alloy bulk and/or the hydrogen storage alloy surface. The activation process enhances the properties of the hydrogen storage alloy material for operation as a catalytic material for the fuel cell anode.

Activation is believed to result from 1) removal of reducible surface oxides which tend to interfere with the functioning of the material, 2) reduction of particle size resulting from an increase in volume, which fractures the alloy particles, and 3) changes in the chemical composition and/or structure of the alloy and/or the surface of the alloy.

It is noted that good catalytic properties, high rate capability and large surface area are important factors for a hydrogen storage alloy electrode when used as an anode of a fuel cell. The hydrogen storage alloy material serves as a catalyst for the dissociation of hydrogen gas fuel into hydrogen atoms. Storage capacity and high loading of the hydrogen storage alloy material, while important for many battery applications, are secondary for fuel cell applications.

Activation of a hydrogen storage alloy battery electrode may be achieved through the surface treatment of the electrode by subjecting the electrode to an alkaline or acidic etching treatment. This type of surface treatment alters the surface oxides of the hydrogen storage alloy. An example of a hot alkaline etch treatment is provided in U.S. Pat. No. 4,716,088, the disclosure of which is incorporated by reference herein. However, for fuel cell applications, this form of activation may not be feasible. The present invention is directed to an alternate activation process which uses electrical current to activate the hydrogen storage alloy electrode used in a fuel cell.

SUMMARY OF THE INVENTION

Disclosed herein is a method of activating a hydrogen storage alloy electrode, comprising the step of:

applying a plurality of current cycles to the electrode, each of the current cycles including a forward current effective to at least partially charge the electrode and a reverse current effective to at least partially discharge the electrode.

BRIEF DESCRIPTION OF THE FIGURES

FIG. 3 is a diagram showing an example of an anode layer for an alkaline fuel cell comprising a catalyst and a hydrophobic material;

FIG. 4 is an example of a current waveform for activating a hydrogen storage alloy electrode;

DETAILED DESCRIPTION OF THE INVENTION

The present invention is related to a method of activating a hydrogen storage alloy electrode for a fuel cell. In particular, the present invention is related to a method of activating the hydrogen storage alloy electrode of an alkaline fuel cell. Typically, the hydrogen storage alloy electrode is used as the "anode" of an alkaline fuel cell (that is, the electrode where hydrogen oxidation occurs).

Figure 1:
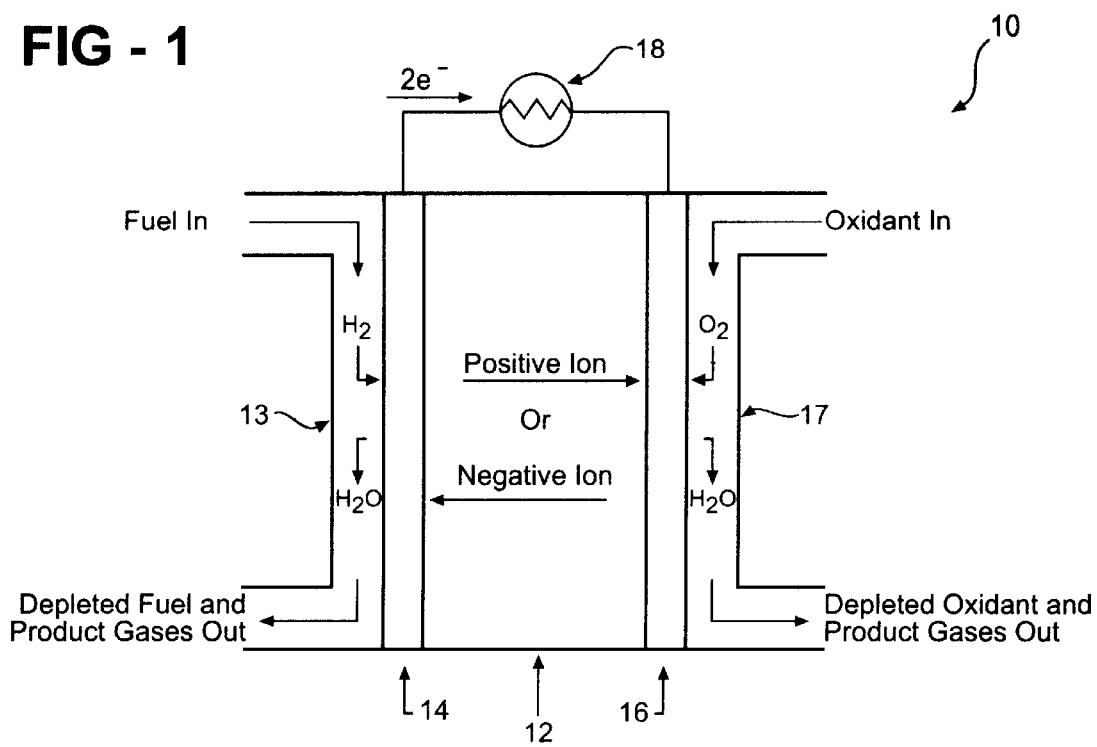
FIG. 1 is a schematic diagram of a fuel cell.
Figure 2:
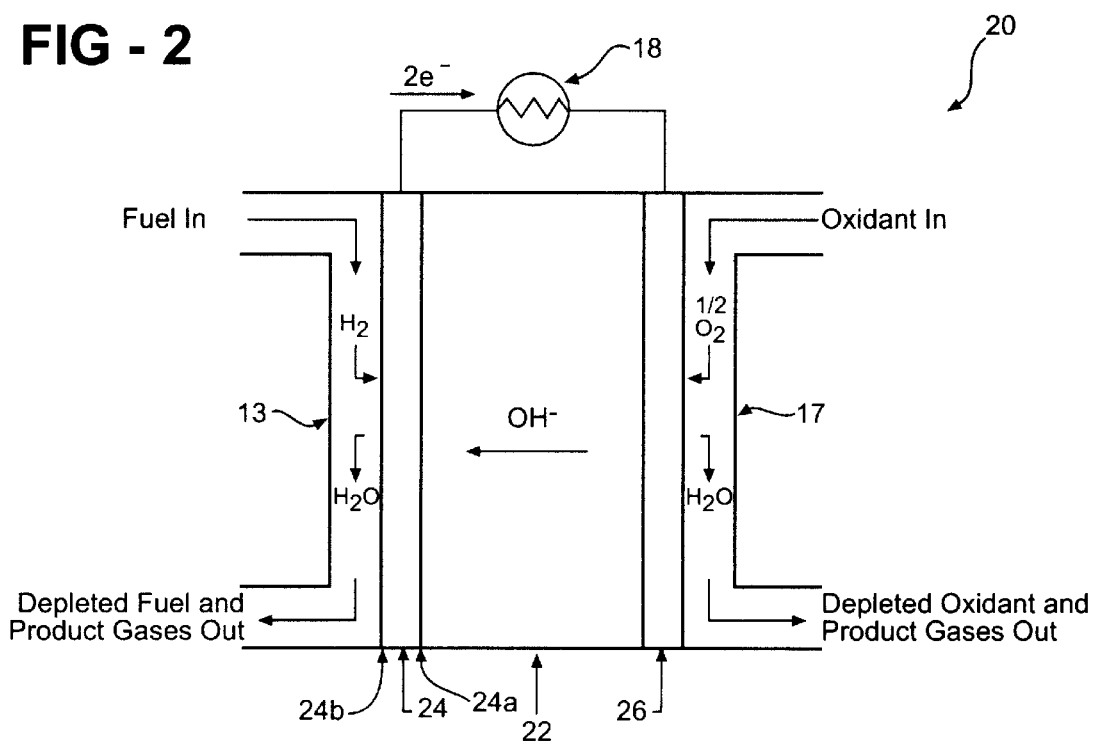
FIG. 2 is a schematic diagram of an alkaline fuel cell.

An example of an alkaline fuel cell is shown in FIG. 2. As shown in FIG. 2, an alkaline fuel cell 20 comprises an anode 24, a cathode 26 and an alkaline electrolyte 22 held within a porous non-conducting matrix between the anode 24 and the cathode 26. The alkaline electrolyte is typically an aqueous solution of an alkali metal hydroxide such as potassium hydroxide, sodium hydroxide, lithium hydroxide or mixtures thereof. The anode 24 comprises a conductive substrate and an anode active composition supported on the substrate. The cathode 26 comprises a conductive substrate and a cathode active composition supported on the substrate.

A hydrogen gas is fed to the anode 24 and an oxygen gas or air is fed to the cathode 26. In the embodiment shown, the hydrogen gas is fed to the anode 24 via the hydrogen compartment 13, and the oxygen gas or air is fed to the cathode 26 via the oxygen/air compartment 17. The reactant gases diffuse through the electrodes to react with the electrolyte 22 in the presence of the catalyst to produce water, heat and electricity. It is noted that the anode 24 has an electrolyte side 24a that makes contact with the electrolyte and a gas side 24b that makes contact with the hydrogen compartment 13. The anode 24 includes a hydrophobic material which prevent the electrolyte 22 from entering the gas compartment 17.

At the anode 24 of an alkaline fuel cell, the hydrogen is electrochemically oxidized and gives up electrons according to the reaction:

$$H_2(g) + 2OH^- \rightarrow 2H_2O + 2e^- \quad (1)$$

This reaction takes place in the presence of an anode catalyst. The electrons so generated are conducted from the anode 24 through an external circuit to the cathode 26.

At the cathode 26 electrons are electrochemically combined with the oxidant according to the reaction:

$$\tfrac{1}{2}O_2(g) + H_2O + 2e^- \rightarrow 2OH^- \quad (2)$$

This reaction takes place in the presence of a cathode catalyst. A flow of hydroxyl (OH) ions through the electrolyte 22 completes the electrical circuit.

The anode catalyst serves as a catalyst for the formation of H$^+$ ions from the H$_2$ gas. This occurs from the formation of atomic hydrogen from molecular hydrogen. The overall reaction can be seen as follows (where M is the anode catalyst):

$$H_2 + 2M \rightarrow 2MH \rightarrow 2M + 2H^+ + 2e^- \quad (3)$$

As discussed, the anode 24 comprises an anode active composition affixed to a conductive substrate. FIG. 3 shows a detailed example of an embodiment of the anode active composition 24'. Referring to FIG. 3, the anode active composition 24' includes a catalytically active material 32 and a polymeric hydrophobic material 34. An example of a polymeric hydrophobic material is PTFE. The active material 32 may be intermixed with the hydrophobic material 34. Preferably, the active electrode composition for the anode comprises between about 3 wt % to about 30 wt % of the hydrophobic material. More preferably, the active electrode composition for the anode comprises between about 5 wt % and about 15 wt % of the hydrophobic material. The catalytically active material 32 forms a network of channels for the electrolyte through the anode active composition 24'. The above described electrochemical reactions occur at the surface of the catalytically active particles. The porous hydrophobic material 34 binds the anode layer active composition 24' together and provides a network of channels through which reactant gases gain access to the catalytic surface of the active material 32.

In an alternate embodiment of the active anode material, the hydrophobic material may be in the form of a hydrophobic layer (rather than being intermixed with the catalytic material). The hydrophobic layer may be placed adjacent to a catalyst layer. The catalyst layer may be in the form of catalytic material which is affixed to a conductive substrate.

When making the active anode composition, it is preferable that the catalytically active particles not be packed too tightly. That is, it is preferable that the packing density of the hydrogen storage alloy particles be low enough for there to be sufficient space between the particles to allow the hydrogen gas and electrolyte to diffuse through the material and react at the surfaces of the hydrogen storage alloy particles. (This is in contrast to many battery applications where the active electrode materials are tightly packed to increase capacity).

When the anode 24 is first placed in contact with the electrolyte layer 22, the electrolyte begins to diffuse or soak though the pores of the active anode material to wet the anode. As the electrolyte soaks into the anode the electrical resistance of the anode decreases. The added hydrophobic material prevents the electrolyte from soaking all the way through to the gas compartment.

As noted above, in a preferred embodiment of the alkaline fuel cell, the catalytic active material of the fuel cell anode comprises a hydrogen storage alloy material. Hence, the anode is a hydrogen storage alloy electrode (also referred to as a metal hydride electrode). Generally, any hydrogen storage alloy material may be used as the catalytic material for the fuel cell anode. Based on the pioneering principles of Stanford R. Ovshinsky, a family of extremely efficient electrochemical hydrogen storage materials were formulated. These are the Ti—V—Zr—Ni type active materials such as those disclosed in U.S. Pat. No. 4,551,400 ("the '400 patent") the disclosure of which is incorporated herein by reference. These materials reversibly form hydrides in order to store hydrogen. All the materials used in the '400 patent utilize a generic Ti—V—Ni composition, where at least Ti, V, and Ni are present with at least one or more of Cr, Zr, and Al.

Other examples of metal hydride alloys are provided in U.S. Pat. No. 4,728,586 ("the '586 patent") the disclosure of which is incorporated herein by reference. Still other examples of hydrogen absorbing alloys are provided in U.S. Pat. No. 5,536,591 ("the '591 patent"), the disclosure of which is incorporated herein by reference.

The catalytic properties of the hydrogen storage alloy materials are enhanced by activating the materials. The activation of the hydrogen storage alloy electrode is achieved by "current cycling" the electrode in the presence of an alkaline electrolyte. That is, the electrode is subjected to a plurality of current cycles while in contact with an alkaline electrolyte. Each current cycle includes a "forward" current pulse effective to at least partially charge the electrode. During the application of the forward current, the hydrogen absorbing alloy electrode is at least partially charged causing the absorption of hydrogen by the hydrogen absorbing alloy material. This is shown by reaction (4) where M is the hydrogen storage alloy material.

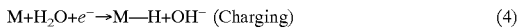

$$M + H_2O + e^- \rightarrow M\text{---}H + OH^- \text{ (Charging)} \quad (4)$$

Each current cycle further includes a "reverse" current pulse effective to at least partially discharge the 5 electrode. During application of the reverse current, the hydrogen storage alloy electrode is at least partially discharged causing the stored hydrogen to be released by the metal hydride material. This is shown by reaction (5).

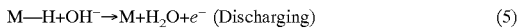

$$M\text{---}H + OH^- \rightarrow M + H_2O + e^- \text{ (Discharging)} \quad (5)$$

Preferably, each forward current pulse is sufficient to only partially charge the electrode and each reverse current pulse is sufficient to only partially discharge the electrode.

A sufficient number of current pulse cycles are applied to the electrode until the desired amount of activation is achieved. Preferably, pulses are applied until the electrode reaches a charge level which is at least 25% of its theoretical capacity. More preferably, the pulses are applied until the electrode is charged to at least 50% of its theoretical capacity. Most preferably, the pulses are applied until the electrode is charge to at least 100% of its total capacity. However, it is also possible to apply pulses to the electrode until the electrode reaches a charge level which is at least 200% or even at least 300% of its total capacity.

A schematic diagram of an embodiment of the current cycle waveform in shown in FIG. 4. Referring to FIG. 4, it is seen that each current cycle includes a forward or charging current pulse applied at a substantially constant current $I_c$ for a time $T_c$. The charging current pulse is followed by a reverse or discharging current pulse applied at a substantially constant current $I_d$ for a time period $T_d$. Of course, other waveform embodiments are possible where the currents $I_c$ and $I_d$ can be made to vary with time (rather than being constant with time). The current amplitudes, rise times, fall times, as well as the time periods that the currents are applied may be varied. Hence, in general, the forward and reverse current pulses may have any shape.

The amount of charging per cycle (that is, the amount of charging due to a forward or charging current pulse) is equal to the charging current $I_c$ multiplied by the charging time period $T_c$. The amount of discharging per cycle (that is, the amount of discharging due to the reverse or discharging current pulse) is equal to the discharge current $I_d$ multiplied by the discharge time period $T_d$. (The amount of charging per cycle or discharging is preferably given in units of amp-hours). Preferably, the amount of charging per cycle due to a forward current pulse is greater than the amount of discharging per cycle due to a reverse current pulse so that $I_c T_c > I_d T_d$.

Figure 5:
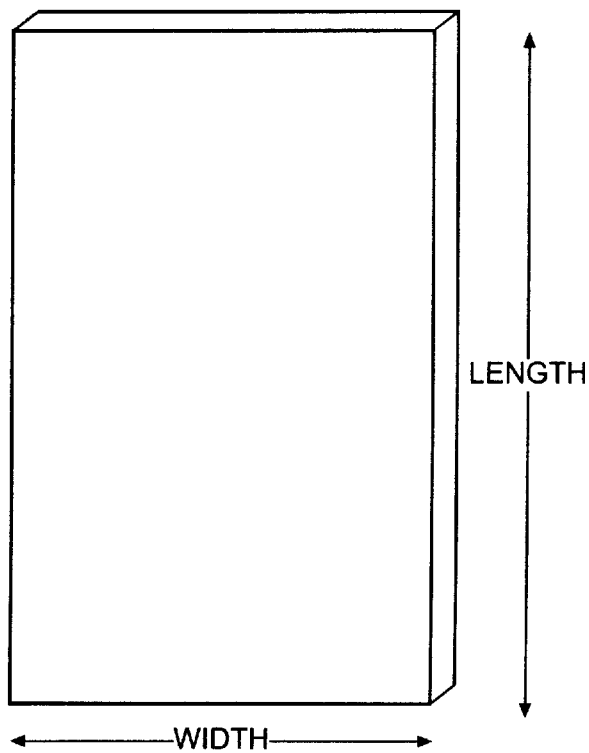
FIG. 5 is a simplified view of a fuel cell electrode showing the length and width.

It is noted that for fuel cells, the charging and discharging current densities are also important measurements related to activation. As used herein the charging current density is the charging current ($I_c$) divided by the geometric surface area of a face of the electrode being activated. Typically the geometric surface area of a large side or face of a prismatic electrode is simply the electrode's length multiplied by its width. A highly simplistic view of an embodiment of a prismatic electrode is shown in FIG. 5 showing how the length and width may be measured to determine the geometric surface area. Likewise, the discharging current density is the discharging current divided by the geometric surface area of the electrode. The current densities may be measured in units of amps per square centimeter.

The charging and/or discharging current densities used to activate the fuel cell electrodes may be related to the desired operating current density of the fuel cell. For example, in one embodiment of the invention, the charging current density used during the activating process is preferably between about 0.5% and about 100% of the desired operating current density of the fuel cell, and more preferably between about 10% and about 90% of the desired operating current density of the fuel cell.

The ratio of the amount of charging per cycle to the amount of discharging per cycle is referred to herein as the charge-discharge ratio. It is preferable that the charge-discharge ratio is at least 5 to 1, more preferably at least 6 to 1, and most preferably at least 7.5 to 1. It is also possible that the charge-discharge ratio may be at least 10 to 1. In yet other embodiments of the invention the charge-discharge ratio is preferably at least 25 to 1, more preferably at least 50 to 1, most preferably at least 100 to 1. The charge-discharge ratio may be changed by altering the pulse width of the charging pulse and/or the discharging pulse. It may also be changed by altering the current level (i.e., amplitude) of the charging pulse and/or the discharging pulse. In one embodiment, the current levels $I_c$ and $I_d$ of the charging and discharging pulses are kept the same (that is $I_d = I_c$) while the pulse widths $T_c$ and $T_d$ are adjusted to reach the appropriate charge-discharge ratio. Hence, in this case, the ratio of $T_c$ to $T_d$ is preferably at least 5 to 1, more preferably at least 6 to 1, most preferably at least 7.5 to 1. In certain cases it may also be as high as at least 10 to 1.

The amount in which the electrode is charged by each of the forward charging pulses (that is, the amount of charging per cycle) is a certain percentage of its total charge capacity of the electrode. Preferably, the amount of charging per cycle cause by a forward current pulse is less than the total capacity of the electrode. Preferably, the amount of charging per cycle is less than about 10 percent of the total charge capacity of the electrode. More preferably, the amount of charging per cycle is less than about one percent of the total charge capacity of the electrode. Most preferably, the amount of charging per cycle is less than about one-third of one percent of the total charge capacity of the electrode. In another embodiment of the invention, it is preferable that the amount of charging per cycle is less than about one-tenth of one percent of the total charge capacity of the electrode. Decreasing the amount of charging per cycle allows for an increase in the total number of charge-discharge cycles that can be applied to the electrode.

Prior to the application of the first current pulse, the electrode may be charged to an initial charge level. For example, the electrode may preferably be charged to a charge level which is between about 10% state of charge and about 60% state of charge. More preferably, the electrode may be charged to a charge level which is between about 15% state of charge and about 50% state of charge.

Figure 6:
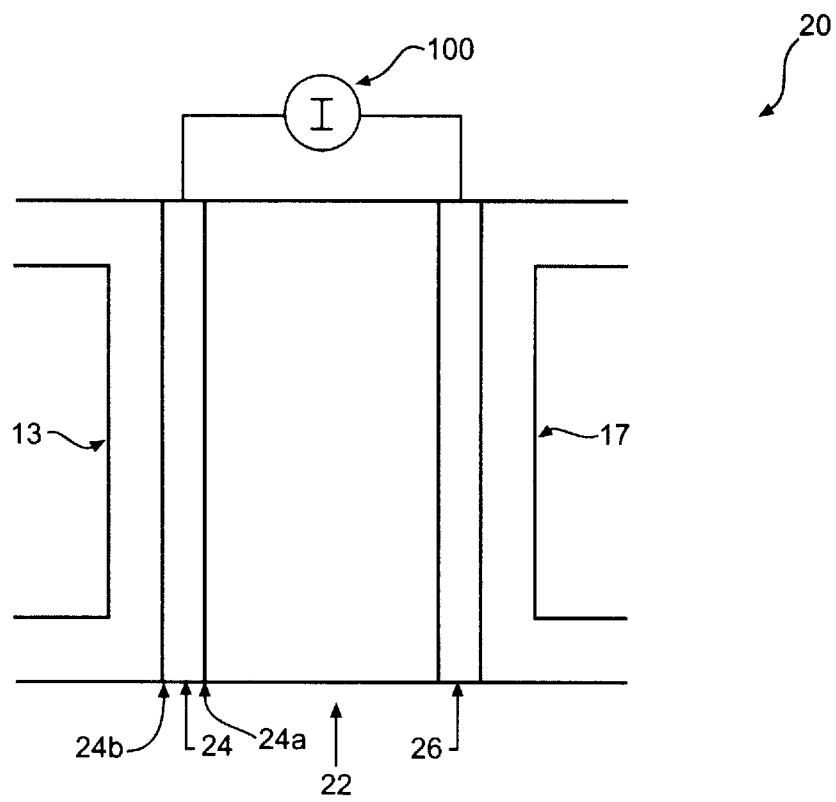
FIG. 6 is a schematic diagram of an alkaline fuel cell coupled to a current source for activating the fuel cell anode where the fuel cell cathode is used as the counter electrode.

There are several different ways in which the forward and reverse currents can be applied to the hydrogen storage alloy electrode (i.e., anode) of the fuel cell. The hydrogen storage alloy electrode may be activated after the fuel cell is assembled. Referring to FIG. 6, it is seen that current source 100 may be applied to the hydrogen storage alloy electrode (i.e., the anode) and the oxygen electrode or cathode of the fuel cell. That is, the oxygen electrode serves as the counter electrode to the hydrogen storage electrode as the hydrogen storage electrode is being charged and discharged. The alkaline electrolyte contacts both the anode being activated as well as the cathode counter electrode. During the current activation process, neither hydrogen gas nor oxygen gas need be applied to the fuel cell; however, as an alternate embodiment of the invention, hydrogen gas may be applied to the hydrogen storage alloy electrode from the oxygen compartment (or elsewhere) before, during or after the current activation process. This may help activate any portion of the hydrogen storage alloy electrode not wetted by the electrolyte and may also improve the activation of the portion of the electrode that is wetted by the electrolyte.

Alternately, the current activation process may be performed by electrically coupling the current source between the hydrogen storage alloy electrode and a third electrode which is different from the oxygen electrode. Hence, a third electrode (preferably, a nickel electrode) may be used as the counter electrode to the hydrogen storage alloy electrode when charging and discharging the hydrogen storage alloy electrode. The hydrogen storage alloy electrode and the third electrode are placed in contact with an alkaline electrolyte during the charging and discharging process to provide ionic transport.

The hydrogen storage alloy electrode may also be activated prior to its integration as part of the fuel cell. The current source may be coupled to the hydrogen storage alloy electrode and a counter electrode (again, preferably a nickel electrode). An alkaline electrolyte contacts both hydrogen storage alloy electrode as well as the counter electrode to provide a means of ionic transport.

While not wishing to be bound by theory, it is believed that repeatedly applying forward and reverse current to the electrode activates the hydrogen storage alloy electrode in several ways. It is believed that the reverse or discharge current pulses encourage dissolution of the surface oxide and/or metal of the hydrogen storage alloy particles. Specifically, the reverse or discharge current pulses may temporarily change the potential of the hydrogen storage alloy electrode to anodic values where oxide and/or metal dissolution is favored. Dissolution of certain oxides and/or metals from the surface and/or bulk of the hydrogen storage alloy material increases the catalytic properties of the hydrogen storage alloy particles. For example, dissolution of certain non-catalytic oxides from the surface may thereby expose metals and/or oxides with increased catalytic properties. In addition, dissolution of certain metals from the particle surface may increase the roughness of the particle surface, thereby increasing the overall surface area of the particle. As discussed above, increased surface area provides for increased number of catalytically active sites and thus also increases the catalytic properties of the hydrogen storage alloy particles. The current cycling technique also effectively takes care of subtle variations in the oxide thickness from batch to batch by subjecting each batch to common anodic discharge pulses. The discharge current pulses also may impose certain density changes in the hydrogen storage alloy electrode, thereby producing micropores through which electrolyte is distributed throughout the electrode. This causes the activation of the electrode to be more complete and uniform.

Also, as discussed above, application of forward and reverse current to the hydrogen storage alloy electrode causes the absorption and desorption of hydrogen atoms by the hydrogen storage alloy. During the application of the forward current, the hydrogen absorbing alloy electrode is charged causing the absorption of hydrogen by the hydrogen absorbing alloy material. This is shown by reaction (4) above. During application of the reverse current, the hydrogen storage alloy electrode is discharged causing the stored hydrogen to be released by the metal hydride material to provide an electric current. This is shown by reaction (5) above.

Hence, application of the forward current pulse causes the anode to reach a potential sufficient to drive hydrogen into the hydrogen storage alloy (hydriding potential). Likewise, the application of a reverse current pulse causes the anode to reach a potential sufficient to drive hydrogen out of the hydrogen storage alloy (dehydriding potential). The absorption and desorption of hydrogen into and out of the hydrogen storage alloy causes expansion and contraction of the alloy which induces stress and forms cracks within the alloy material. The cracking increases the surface area and porosity of the alloy material. Increased surface area improves the catalytic properties of the hydrogen storage alloy material. The improved catalytic properties, the hydrogen oxidation of reaction (1) above occurs much more readily to allow for more efficient hydrogen consumption.

As noted above, the current cycling technique of the present invention may be used to activate the hydrogen storage alloy electrode prior to being sealed in an actual fuel cell, or the same technique may be used to activate the electrode after the electrode is sealed in the fuel cell. In either case, the alkaline electrolyte placed in contact with the hydrogen storage alloy electrode as well as the counter electrode may either be kept at room temperature or at an elevated temperature during the current cycling technique. The temperature of the electrolyte is preferably at least 50° C., more preferably at least 60° C. and most preferably at least 80° C. As noted above the alkaline electrolyte used may be an aqueous solution of an alkali metal hydroxide. Examples of alkaline electrolytes includes potassium hydroxide, lithium hydroxide, sodium hydroxide or combinations thereof. Specifically, the alkaline electrolyte may be a 30 wt % aqeuous solution of potoassium hydroxide.

Moreover, the current cycling technique is applicable to electrodes which have previously been heat-treated by a chemical activation process such as by an alkaline or acidic etch process. As discussed above, a chemical activation process is described in U.S. Pat. No. 4,716,088.

The present invention describes the use of repeatedly applying forward and reverse current to activate the hydrogen storage alloy fuel cell electrode. As shown in FIG. 6 and as explained above, electrical current is applied to the electrode by a controlled current source. It may also possible to activate the fuel cell anode by applying a controlled voltage (via a voltage source) to the electrode instead of a controlled current. (For example, it may also be possible to apply a pulse of a hydriding potential followed by a pulse of a dehydriding potential. More generally, it may also be possible to activate the fuel cell anode by applying a pulse of some hydriding force followed by a pulse of some dehydriding force). However, it is believed that the application of a controlled current to the hydrogen storage alloy electrode via a current source provides for a more effective and more efficient activation process.

Referring to reactions (4) and (5) above, it is seen that the rates in which the hydriding and dehydriding of the hydrogen storage alloy material occur are directly related, respectively, to the amount of forward current and reverse current applied to the electrode. The use of a current source provides for direct control over the amplitudes, rise times, falls times, periods and waveforms of the forward and reverse currents that are applied to the electrode.

In contrast, application of electrical energy to the anode using a controlled voltage (such as by cycling potentials with a voltage source) provides less control over the current that passes through the electrode during activation. In particular, it was noted above that resistance of the fuel cell hydrogen storage alloy electrode changes with time as electrolyte soaks into the electrode (in particular, the resistance decreases as more electrolyte soaks into the electrode). In addition, the activation process itself (due to increases in the catalytic nature of the hydrogen storage alloy material as well as changes in the surface area, porosity and particle size of the hydrogen storage alloy material) causes the resistance of the hydrogen storage alloy electrode to decrease over time during activation.

When using a voltage source (rather than a current source) to apply the electrical energy to the electrode, variations in electrode resistance cause variations in the current passing through the electrode (since the current is inversely related to the resistance). This makes it more difficult to control the actual forward and reverse currents passing through the electrode and thus, may make it more difficult to control the rates of hydriding and dehydriding the electrode. In addition, because of the varying resistance of the fuel electrode over time, it may also be difficult to determine the appropriate voltages to apply to the electrode to achieve the desired hydriding and dehydriding potentials.

EXAMPLE 1

A hydrogen storage alloy material is mixed with a hydrophobic binder and pasted onto a conductive substrate to form a hydrogen storage alloy electrode. The electrode has a geometric surface area of about 5.75 $cm^2$ (i.e., length× width) and a total charge capacity C of about 0.246 amp-hours. The hydrogen storage alloy electrode is used as the hydrogen oxidation electrode (also commonly referred to as the anode) of an alkaline fuel cell. The potential of the hydrogen storage alloy electrode is measured relative to a mercury/mercury oxide reference electrode. A carbon-based electrode is used as the oxygen electrode of the test fuel cell. A third auxiliary electrode (for example, a nickel electrode) is used as the counter electrode for charging and discharging the hydrogen storage alloy electrode. Both the hydrogen storage alloy electrode as well as the nickel counter electrode are placed in contact with a KOH electrolyte. The hydrogen storage alloy electrode is first charged to a 20% state of charge at a charging rate of 0.83C=0.0681 amps to achieve a charging rate current density (charging current/ geometric surface area of electrode) of 0.0681 amps/5.75 $cm^2$=0.0118 amps/$cm^2$. Following this, the hydrogen storage alloy electrode is repeatedly charged for 10 seconds ($T_c$=10 seconds) at rate of 0.83C or 0.0681 amps ($I_c$=0.83C= 0.068 amps) and then discharged for 2 seconds ($T_d$=2 seconds) at a rate of 0.034C or 0.0028 amps ($I_d$=0.034c= 0.0028 amps). Hence, the electrode is repeatedly charged using a current density of 0.0118 amps/$cm^2$ and discharged using a current density of 0.000485 amps/$cm^2$. In this case, the amount of charging per cycle is about 0.00019 amp-hours or about 0.23% of total charge capacity while the charge to discharge ratio per cycle is about 121 to 1. The electrode is current pulsed until it is charged to a total charge of about 0.082 amp-hour or about 300% of its theoretical capacity.

EXAMPLE 2

A hydrogen storage alloy material is mixed with a binder and compacted onto a conductive substrate to form a hydrogen storage alloy electrode. The electrode has a geometric surface area of about 5.75 $cm^2$ and a total theoretical charge capacity of 0.1 amp-hours. The hydrogen storage alloy electrode is used as the anode of an alkaline fuel cell. The potential of the hydrogen storage alloy electrode is measured relative to a mercury/mercury oxide reference electrode. A carbon-based electrode is used as the oxygen electrode of the test fuel cell. A third auxiliary electrode (for example, a nickel electrode) is used as the counter electrode for charging and discharging the hydrogen storage alloy electrode. The hydrogen storage alloy electrode as the nickel counter electrode are placed in contact with an alkaline electrolyte. The hydrogen storage alloy electrode has a total charge capacity C of about 0.1 amp-hour. The hydrogen storage alloy electrode is first charged to a 41% state of charge at a charge rate of 0.7C or 0.07 amps. Hence, the electrode is initially charged at a charge rate current density of about 0.07 amps/5.75 $cm^2$=0.012 amps/$cm^2$. Following this, the electrode is repeatedly charged for 10 seconds ($T_c$=10 seconds) at a rate of 0.83C or 0.083 amps ($I_c$=0.83C=0.083 amps) and then discharged for 2 seconds ($T_d$=2 seconds) at a rate of 0.035C or 0.0035 amps. Hence, the electrode charged at a current density of 0.083 amps/5.75 $cm^2$=0.0144 amps/$cm^2$. The electrode is discharge at current density of 0.0035 amps/5.75 $cm^2$=0.00061 amps/$cm^2$. In this case, the amount of charging per cycle is about 0.00023 amp-hour which is about 0.23% of total charge capacity while the charge to discharge ratio per cycle is about 111 to 1. The current cycles are applied until the electrode is charged to a total charge of about 0.344 amp-hour or to about 342% of its theoretic capacity.

EXAMPLE 3

A hydrogen storage alloy material is mixed with a binder and compacted onto a conductive substrate to form a hydrogen storage alloy electrode. The hydrogen storage alloy electrode has a geometric surface area of about 100 $cm^2$. The hydrogen storage alloy electrode is used as the anode of an alkaline fuel cell. The potential of the hydrogen storage alloy electrode is measured relative to a mercury/mercury oxide reference electrode. A carbon-based electrode is used as the oxygen electrode of the test fuel cell. A third auxiliary electrode (for example, a nickel electrode) is used as the counter electrode for charging and discharging the hydrogen storage alloy electrode. The hydrogen storage alloy electrode as the nickel counter electrode are placed in contact with an alkaline electrolyte. The fuel cell anode is activated with a 0.1 amp charge for 5 seconds ($I_c$=0.1 amp and $T_c$=5 seconds) and a 0.1 amp discharge for 2 seconds ($I_d$=0.001 amps and $T_d$=2 seconds). This corresponds to a 0.001 amp/$cm^2$ current density charge for 5 seconds and a 0.001 amp/$cm^2$ discharge for 2 seconds. The total charge input to the electrode during one charge pulse is 0.00014 amp-hour. The total charge input to the electrode is 2.93 amp-hour. The theoretical capacity of the electrode is 2.4 Ah. Hence, during each forward current pulse, the electrode is charged by an amount 0.0056% of the theoretical capacity. The current cycles are applied until the electrode is charged to about 122% of its theoretical capacity.

We claim:

1. A method of activating an alkaline fuel cell hydrogen storage alloy electrode, comprising the step of:
    applying a plurality of current cycles to said electrode, each of said current cycles including a forward current pulse effective to at least partially charge said electrode and a reverse current pulse effective to at least partially discharge said electrode.

2. The method of claim 1, wherein said forward current pulse is effective to only partially charge said electrode and said reverse current pulse is effective to only partially discharge said electrode.

3. The method of claim 1, wherein the amount of charging per cycle caused by said forward current pulse is greater than the amount of discharging per cycle caused by said reverse current pulse.

4. The method of claim 1, wherein the ratio of the amount of charging per cycle to the amount of discharging per cycle is at least 5 to 1.

5. The method of claim 1, wherein the amount of charging per cycle caused by said forward current pulse is less than ten percent of total charge capacity.

6. The method of claim 1, wherein the amount of charging per cycle caused by said forward current pulse is less than one-third of one percent of total charge capacity.

7. The method of claim 1, further comprising the step of contacting said electrode with hydrogen gas.

8. The method of claim 1, wherein said applying said current cycles step is done while contacting said electrode with an alkaline electrolyte.

9. The method of claim 1, further including the step of pre-charging said electrode to an amount less than full electrode capacity prior to said applying said current cycles.

10. The method of claim 9, wherein said pre-charging step charges said electrode to an amount greater than 10% of said full electrode capacity.

11. A method of activating an alkaline fuel cell, said fuel cell comprising a metal-hydride electrode, said method comprising the step of:

applying an alternating current to said electrode.

* * * * *